US009665107B2

(12) United States Patent
Pemberton

(10) Patent No.: US 9,665,107 B2
(45) Date of Patent: May 30, 2017

(54) CONTROL APPARATUS FOR A GAS PRESSURE REGULATOR

(71) Applicant: Air Products and Chemicals, Inc., Allentown, PA (US)

(72) Inventor: Gareth Ross Pemberton, Worcester (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/909,911

(22) PCT Filed: Aug. 1, 2014

(86) PCT No.: PCT/EP2014/066656
§ 371 (c)(1),
(2) Date: Feb. 3, 2016

(87) PCT Pub. No.: WO2015/018768
PCT Pub. Date: Feb. 12, 2015

(65) Prior Publication Data
US 2016/0179107 A1     Jun. 23, 2016

(30) Foreign Application Priority Data

Aug. 6, 2013   (EP) .................................... 13179494

(51) Int. Cl.
*G05D 16/10*    (2006.01)
*F16K 31/60*    (2006.01)
(Continued)

(52) U.S. Cl.
CPC ........... *G05D 16/10* (2013.01); *F16K 31/602* (2013.01); *F17C 1/00* (2013.01); *F17C 13/04* (2013.01);
(Continued)

(58) Field of Classification Search
CPC ....... G05D 16/10; F16K 31/602; F17C 13/04; F17C 1/00; F17C 2205/0165;
(Continued)

(56) References Cited

U.S. PATENT DOCUMENTS 3,924,654 A    12/1975   Buller
5,275,200 A    1/1994    Yamamoto
(Continued)

FOREIGN PATENT DOCUMENTS

FR    2793297 A1    11/2000
GB    973914 A      11/1964
(Continued)

OTHER PUBLICATIONS

European Patent Office, International Search Report of the international Searching Authority, mailed Oct. 9, 2014, for PCT/EP2014/066656.

*Primary Examiner* — Michael R Reid
*Assistant Examiner* — Patrick Williams
(74) *Attorney, Agent, or Firm* — Larry S. Zelson

(57) ABSTRACT

A pressure regulator assembly comprising a pressure regulator arranged to regulate the flow rate of a gas source from a gas cylinder. The pressure regulator comprises a restriction device located in the pressure regulator, positionable to restrict the flow of gas therethrough, a biasing arrangement to apply a predetermined bias to the restriction device, a selection device operable to select a configuration of the biasing arrangement and restriction device to provide a selected gas pressure at said outlet, and a rotatable handle rotatable about an axis of rotation. A rotary control member and said rotatable handle are operable to move a control device between maximum and minimum linear positions in a direction substantially parallel to the axis of rotation. The
(Continued)

bias from said biasing arrangement is dependent upon the linear position of the control device.

20 Claims, 11 Drawing Sheets

(51) Int. Cl.
*F17C 13/04* (2006.01)
*F17C 1/00* (2006.01)

(52) U.S. Cl.
CPC ............... *F17C 2205/0165* (2013.01); *F17C 2205/0308* (2013.01); *F17C 2205/0338* (2013.01); *F17C 2270/0745* (2013.01)

(58) Field of Classification Search
CPC ...... F17C 2205/0308; F17C 2270/0745; F17C 2205/0038

USPC .................. 137/505, 505.14, 505.22–24; 251/284–288

See application file for complete search history.

(56) References Cited

U.S. PATENT DOCUMENTS

| 5,657,787 | A | * | 8/1997 | Diehl | ............... G05D 16/10 137/116.5 |
| 8,651,452 | B2 | * | 2/2014 | Hemman | ............ F16K 1/221 251/107 |
| 2008/0047619 | A1 | | 2/2008 | Pechtold | |

FOREIGN PATENT DOCUMENTS

| GB | 1018957 A | 2/1966 |
| GB | 2038970 A | 7/1980 |

* cited by examiner

CONTROL APPARATUS FOR A GAS PRESSURE REGULATOR

The present invention relates to a control apparatus for a pressure regulator. More particularly, the present invention relates to a control apparatus for a pressure regulator which is more ergonomic, safer and efficient to use than conventional arrangements.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric speciality gases. Commonly, pressurised gas containers comprise steel, aluminium or composites and are capable of storing compressed, liquefied or dissolved gases with a maximum filling pressure up to 450 barg for most gases, and up to 900 barg for gases such as hydrogen and helium.

FIG. 1 shows a conventional arrangement for dispensation of a gas. A gas cylinder 10 stores gas at high pressure, for example, 200 to 300 bar. The gas cylinder 10 has a gas cylinder body 12 comprising a generally cylindrical container having a flat base arranged to enable the gas cylinder 10 to stand unsupported on a flat surface.

The gas cylinder body 12 is formed from steel, aluminium and/or composite materials and is adapted and arranged to withstand the significant internal pressures resulting from the storage of high pressure gas.

In order to dispense gases effectively and controllably from a gas cylinder or other pressure vessel, a regulator and/or valve assembly is required. A valve provides a mechanism by which the flow of gas can be controlled. A regulator is able to regulate the flow of the gas such that the gas is dispensed at a constant, or user variable, pressure.

As shown in FIG. 1, a primary regulator 14 is located downstream of the gas cylinder 10, the primary regulator 14 comprising a control valve employing a feedback mechanism such that a constant pressure is maintained at a point downstream of the primary regulator 14. A safety relief valve 16 is arranged downstream of the pressure regulator 14.

The regulator 14 supplies gas at a fixed pressure to a user application 18 connected thereto. The user application may be, for example, MIG/MAG welding equipment.

The flow rate is generally controlled by restricting the gas flow, typically through the primary regulator 14 or through orifices downstream thereof. Gas flow can be precisely metered by controlling the upstream pressure across a fixed orifice size, where the downstream pressure is substantially lower than the upstream pressure.

An end-user application such as MIG/MAG welding requires a user to operate a valve and regulator 14 connected to the gas cylinder to enable a flow of gas through the system. The user then would set the flow so that gas is delivered at the point-of-use at near atmospheric pressure at a prescribed rate, e.g. 15 l/min. A typical scenario would be to connect a gas pressure regulator to a gas cylinder and use the downstream low pressure indicator to set the pressure. A flow meter is then typically used to set the flow.

The use of a typical high pressure gas cylinder requires the user to open the valve by turning a handle through a minimum of 360° i.e. one full turn. However up to 3 full turns is common. This approach means that it is difficult, if not impossible, to provide a useful indication of the position of the valve or the status of the gas cylinder by cursory visual inspection alone. In other words, the fact that the handle must be rotated through at least one full turn between on and off positions means that any one position of the handle does not represent a unique position of the valve. Therefore, the status of the valve and gas cylinder cannot be quickly identified without close observation.

Further, conventional approaches require the attachment of a cylinder regulator to the gas cylinder requires more manual manipulations to both connect the regulator to the cylinder and adjust the regulator to the required settings.

In the case of a welding application, flow metering valve is often employed through which further manipulation is required for each weld process set up. The requirement to attach and adjust various devices in addition to the gas cylinder exposes the user to potentially high pressure gas which carries safety concerns in terms of both the high pressure of the gas and the potentially asphyxiating quality of the gas.

In summary, a typical set up of a gas cylinder and regulator requires the user to closely inspect the system to determine if gas is present in the lines by looking at, for example, a small gauge typically carried on a gas regulator.

Therefore, conventional arrangements suffer from the technical problem that they do not enable a user to switch on a gas cylinder in a straightforward manner and subsequently determine whether the cylinder and lines are under pressure without detailed inspection.

According to an aspect of the present invention, there is provided a pressure regulator assembly comprising a pressure regulator arranged to regulate the flow rate of a gas source from a gas cylinder, the pressure regulator comprising: a housing having an inlet connectable to the gas source, an outlet, a conduit extending between the inlet and the outlet; a restriction device located in the conduit and positionable to restrict the flow of gas therethrough; a biasing arrangement to apply a predetermined bias to the restriction device; a selection device operable to select a configuration of the biasing arrangement and restriction device to provide a selected gas pressure at said outlet; and a rotatable handle rotatable about an axis of rotation and comprising a central boss and a graspable arm; wherein the selection device comprises a rotary control member arranged such that rotational movement of said rotatable handle about said axis of rotation between maximum and minimum positions is operable to move a control device between corresponding maximum and minimum linear positions in a direction substantially parallel to the axis of rotation, the bias from said biasing arrangement being dependent upon the linear position of the control device, and wherein the angular difference in position of the rotatable handle between said maximum and minimum positions is 180 degrees or less.

In one embodiment, the angular difference in position of the rotatable handle between said maximum and minimum positions is 90 degrees or less.

In one embodiment, when the pressure regulator assembly is located on a gas cylinder and said gas cylinder is in a substantially upright position, the rotatable handle is rotatable about a substantially horizontal axis such that said graspable arm moves in a substantially vertical plane.

According to a first aspect of the present invention, there is provided a pressure regulator assembly comprising a pressure regulator arranged to regulate the flow rate of a gas source from a gas cylinder, the pressure regulator comprising: a housing having an inlet connectable to the gas source, an outlet, a conduit extending between the inlet and the outlet; a restriction device located in the conduit and positionable to restrict the flow of gas therethrough; a biasing arrangement to apply a predetermined bias to the restriction device; a selection device operable to select a configuration of the biasing arrangement and restriction device to provide a selected gas pressure at said outlet; and a rotatable handle rotatable about an axis of rotation and comprising a central boss and a graspable arm; wherein the selection device comprises a rotary control member connected to said rotatable handle such that rotational movement of said rotatable handle about said axis of rotation between maximum and minimum positions is operable to move a control device between corresponding maximum and minimum linear positions in a direction substantially parallel to the axis of rotation, the bias from said biasing arrangement being dependent upon the linear position of the control device, and wherein the angular difference in position of the rotatable handle between said maximum and minimum positions is 180 degrees or less and, when the pressure regulator assembly is located on a gas cylinder and said gas cylinder is in a substantially upright position, the rotatable handle is rotatable about a substantially horizontal axis such that said graspable arm moves in a substantially vertical plane.

In one embodiment, said graspable arm has a longitudinal axis, said longitudinal axis extending away from said axis of rotation in a substantially radial direction.

In one embodiment, the assembly further comprises a guard arranged to surround the pressure regulator, the guard comprising an aperture arranged such that, in use, at least a part of the graspable arm extends therethrough irrespective of the position of the rotatable handle.

In one embodiment, the aperture comprises an arcuate channel.

In one embodiment, the biasing arrangement comprises at least one control compression spring and the bias of the control compression spring is dependent upon the linear offset of said control device.

In one embodiment, said control device comprises at least one pin operable to slide within at least one corresponding channel on said rotary control member, said pin and channel controlling the linear movement of said control device.

In one embodiment, the selection device has a plurality of discrete, offset positions defining a plurality of discrete, offset configurations of the biasing arrangement and restriction device each to provide a selected gas pressure at said outlet.

In one embodiment, the number of selectable discrete, offset positions is five or fewer.

In one embodiment, the or each channel comprising a plurality of locating notches for receiving the or each corresponding pin, each locating notch defining a discrete configuration of said selection device.

In one embodiment, the restriction device comprises a linearly-movable valve connected to a diaphragm or a piston.

According to a second aspect of the present invention, there is provided a valve assembly including the pressure regulator of the first aspect.

According to a third aspect of the present invention, there is provided a gas cylinder assembly including a gas cylinder body and the valve assembly of the second aspect.

Embodiments of the present invention will now be described in detail with reference to the accompanying drawings, in which.

Figure 1:
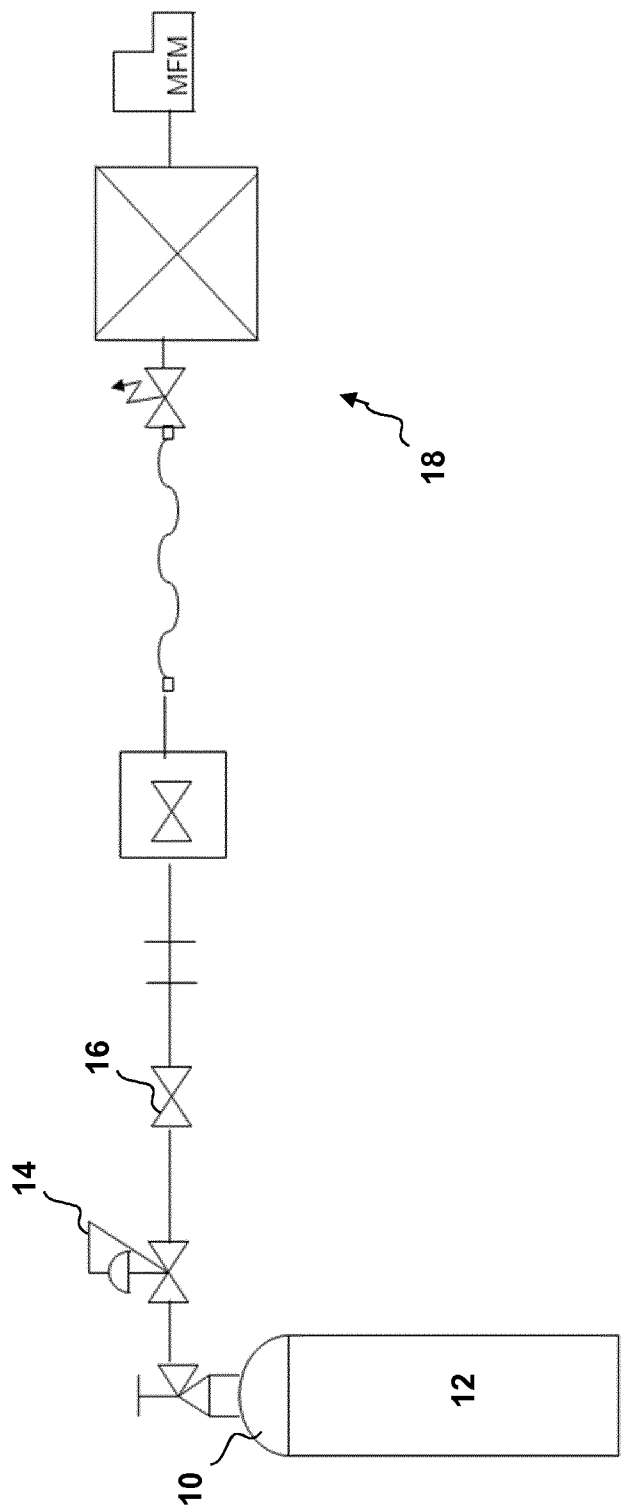
FIG. 1 is a schematic diagram of a gas cylinder and regulator assembly.
Figure 2:
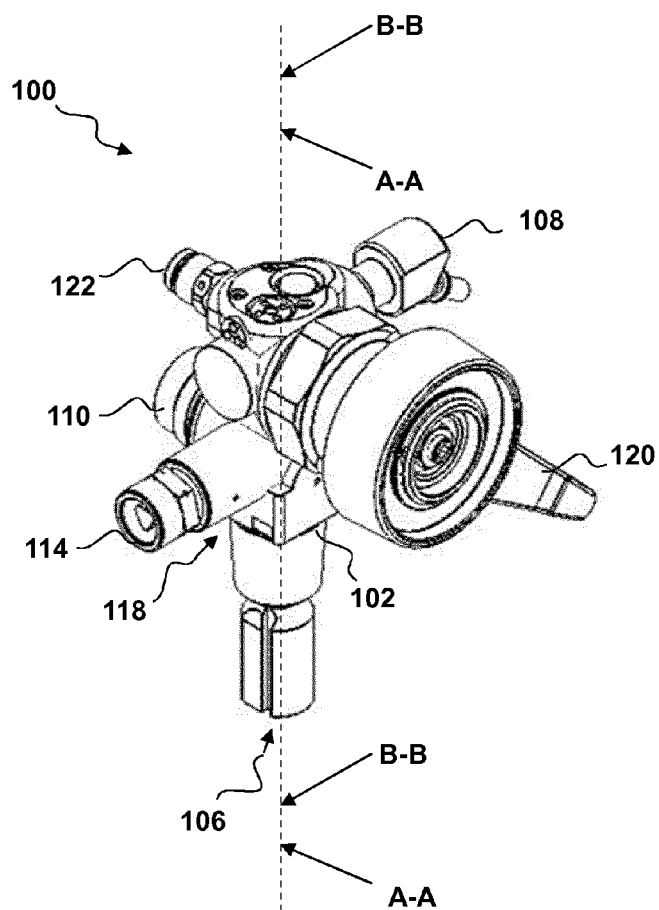
FIG. 2 is an isometric view of a valve and pressure regulator assembly according to an embodiment.
Figure 4:
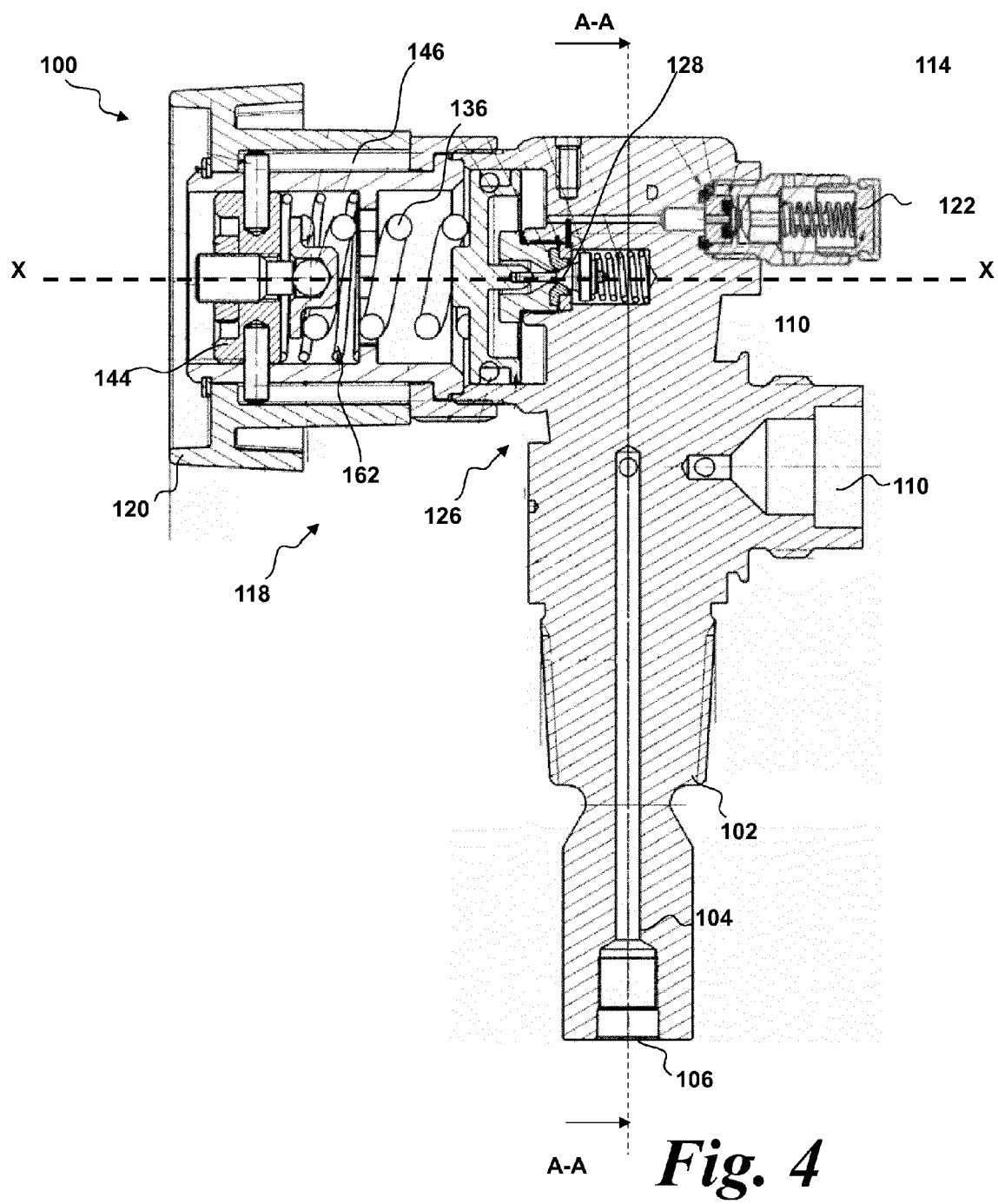
FIG. 4 is a cross-sectional view taken through the valve of FIG. 3 in the direction A-A shown in FIG. 2.

FIG. 2 shows an isometric view of the valve and pressure regulator assembly 100 according to an embodiment of the present invention. FIG. 2 shows an isometric view of the valve assembly 100. FIG. 4 shows a general schematic component overview of a valve assembly 100 according to an embodiment of the present invention. The valve assembly 100 is suitable for connection to a gas cylinder 12 as shown in later figures.

The valve assembly 100 may, for example, comprise a VIPR (Valve with Integrated Pressure Regulator). The valve 100 comprises a valve body 102. A conduit 104 is formed in the valve body 102 and extends through the interior of the valve body 102 between an inlet 106 and an outlet 108 to enable gas to flow in a controlled manner from the gas cylinder 12 to end user applications downstream of the outlet 108.

The valve body 102 comprises a screw thread adjacent the inlet 106 for engagement with a complementary aperture at a neck of the gas cylinder 12. The outlet 108 is adapted and arranged to enable the gas cylinder 12 to be connected to other components in a gas assembly; for example, hoses, pipes, or further pressure valves or regulators.

A fill port 110 including a valve 112 is located in a branch pipe extending from the conduit 104. The fill port 110 enables the gas cylinder 12 to be filled with gas in use. A residual pressure shut-off valve 114 is located in the conduit 104 downstream of the gas cylinder 12.

A filter 116 is located downstream of the shut-off valve 114. Downstream of the filter 116 is located a pressure regulator 118. The pressure regulator 118 is operable to provide a fixed, regulated pressure output to the outlet 108 as will be described later. The pressure is selectable by a rotatable, graspable handle 120 (as shown in FIG. 2) and can be set to discrete pressure values. The components of the pressure regulator 118 will be described in more detail later with reference to FIGS. 5 to 8.

The valve assembly 100 further comprises a safety relief valve 122 located downstream of the pressure regulator 118 and upstream of the outlet 108. The outlet 108 comprises a flow restriction orifice selected from a group of orifices as will be described later.

Figure 5:
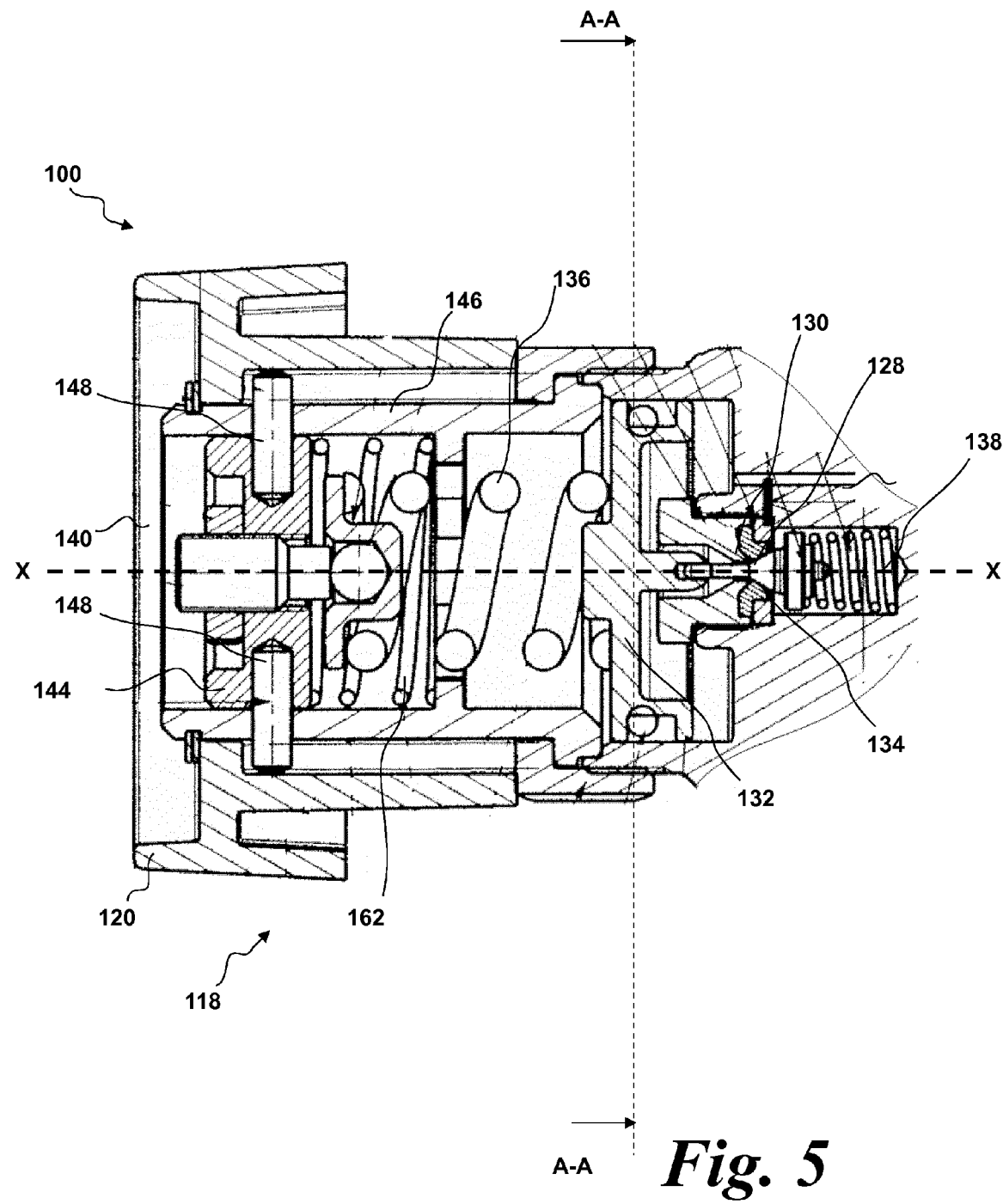
FIG. 5 is a magnified view of the pressure regulator of FIG. 4.
Figure 6:
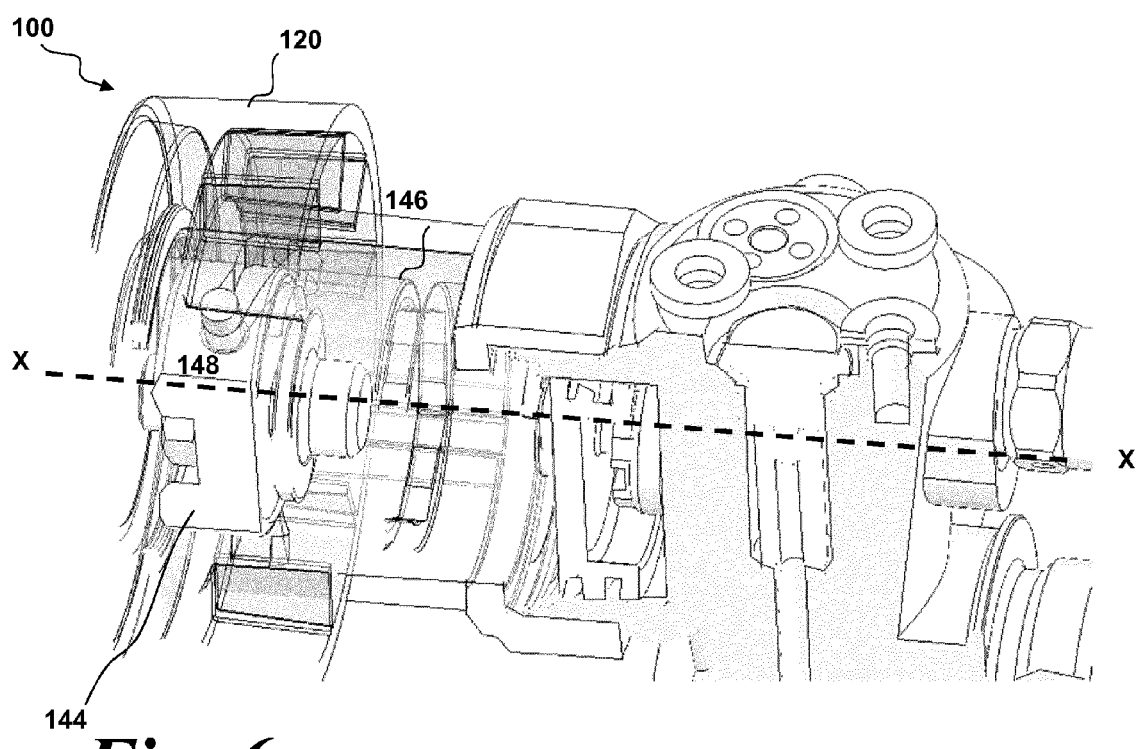
FIG. 6 is an isometric cut-away view of the valve assembly of FIG. 2.

FIGS. 4, 5 and 6 show the valve assembly 100 in more detail. FIG. 4 shows a cross section through the valve assembly 100 taken in the direction A-A of FIG. 2. FIG. 5 shows a more detailed view of FIG. 4. The pressure regulator 118 will now be described in more detail with reference to FIGS. 4 and 5. Detailed components are only labelled in FIG. 5.

In this embodiment, the pressure regulator 118 comprises a single piston regulator. However, the skilled person would be readily aware of variations that could be used with the present invention; for example, a diaphragm regulator (as will be described in a later embodiment) or other arrangement.

The regulator 118 comprises a valve region 126 in communication with the inlet 106 and outlet 108. The valve region 126 comprises a poppet valve 128 located adjacent a valve seat 130. The poppet valve 128 is connected to a piston 132 which is configured to enable translational movement of the poppet valve 128 along the axis X-X towards and away from the valve seat 130 to close and open respectively an aperture 134 therebetween.

The piston 132 is resiliently biased by a biasing arrangement in the form of a control spring 136 located about the axis X-X. However, other biasing arrangements may be used as appropriate, for example other resilient means or pressure-based devices. The skilled person would be readily aware of variations which would fall within the scope of the present invention.

A further opposing spring 138 is provided to act directly on the poppet valve 128 to provide a stabilising and centring force on the poppet valve 128.

The regulator 118 is operable to receive gas from the gas cylinder 12 at full cylinder pressure (e.g. 100-900 bar), but to deliver gas at a substantially constant fixed low pressure (e.g. 5 bar) to the outlet 108. This is achieved by a feedback mechanism whereby the pressure of gas downstream of the aperture 134 is operable to act on the piston 132 in opposition to the biasing force of the spring 136. This counter-balancing effect provides for a particular pressure at which the system is in equilibrium. Thus, at the desired particular set pressure, the spring and gas forces are selected to be equal.

Therefore, should the pressure of gas in the region adjacent the piston 132 exceed the specified level, the piston 132 is operable to move along the axis X-X (towards the left hand side of FIGS. 5 and 6). As a result, the poppet valve 128 is moved closer to the valve seat 130, reducing the size of the aperture 134 and, consequently, restricting flow of gas from the inlet 106 to the outlet 108. Concomitantly, if the gas pressure reduces, the poppet valve 128 is arranged to move away from the valve seat 130 and the size of the aperture 134 is increased.

The mechanism by which the pressure can be set will now be described. The pressure of the gas can be set either as a continuously variable value, or at predetermined, discrete pressures.

Figure 3:
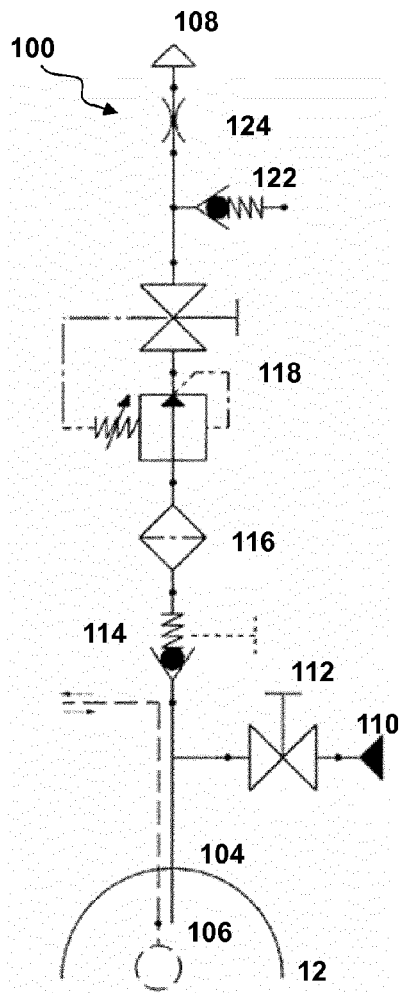
FIG. 3 is a schematic diagram of the components of the valve and pressure regulator of FIG. 2.

The graspable handle 120 (shown in FIGS. 3, 5 and 6) enables a user to specify the pressure setting of the pressure regulator 118. The graspable handle 120 comprises a central boss 140 and a graspable arm 142 attached thereto. The central boss 140 is rotatable about the axis X-X and is connected to the valve body 102 by means of a screw or other releasable connection.

As shown in FIGS. 4 to 6, the pressure regulator 118 comprises a central barrel 144 surrounded by a cylindrical guide 146. The central barrel 144 is arranged to rotate within the cylindrical guide 146 and to translate back and forth along the axis X-X relative thereto.

With reference to FIGS. 4 to 6, the central barrel 144 comprises a pair of equi-spaced pins 148. The pins 148 are located at opposing sides of the central barrel 144 and extend outwardly therefrom.

Figure 7:
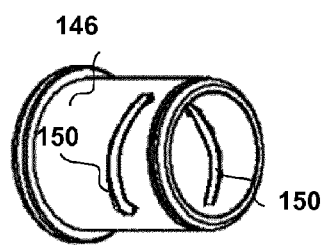
FIG. 7 is an isometric view of a cylindrical guide of the valve assembly of FIGS. 2 and 6.

As shown most clearly in FIG. 7, the cylindrical guide 146 comprises a pair of channels 150. Each of the pins 148 is received in a respective channel 150 and extends therethrough. Each channel 150 extends around the circumference of the cylindrical guide 146 at an acute angle to the axis X-X. In other words, each channel 150 has a length component which extends along the axis X-X. Therefore, rotational movement of the central barrel 144 relative to the cylindrical guide 146 will cause, by virtue of the pins 148 moving in the respective channels 150, the central barrel 144 to translate back and forth along the axis X-X towards and away from the piston 132.

The distal ends of the pins 148 are connected to the central boss 140 of the graspable handle 120 through use of a circlip or other connecting means. Thus, in use, the graspable arm 142 can be rotationally manipulated by a user to move the pins 148 within the channels 150 and so translate the central barrel 144 back and forth along the axis X-X.

FIG. 7 shows an example of the cylindrical guide 146 in which a pair of substantially linear channels 150 is provided. This enables continuous adjustment of the central barrel 144 between minimum and maximum positions.

Figure 8:
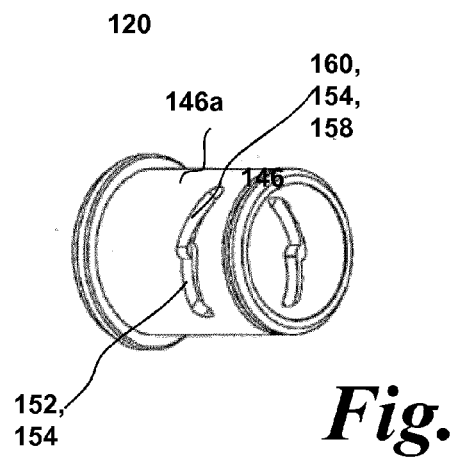
FIG. 8 is an isometric view of an alternative cylindrical guide of the valve assembly of FIGS. 2 and 6.
Figure 9:
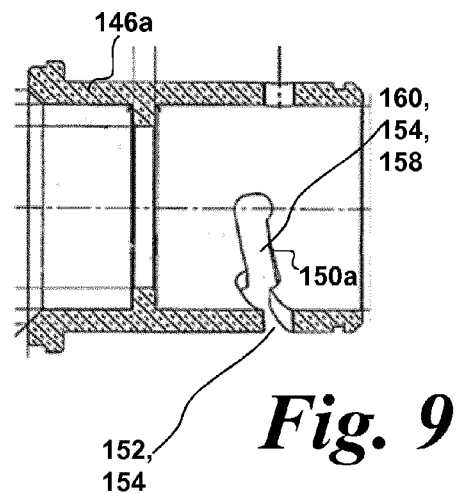
FIG. 9 is a cross section taken through the cylindrical guide of FIG. 8.

A variation is shown in FIGS. 8 and 9. In FIGS. 8 and 9, the cylindrical guide 146a is shown with specific, locating portions to specify particular set positions of the pins 148 within the channels.

In FIGS. 8 and 9, each of the channels 150a comprises first and second sections 152, 154. The first and second sections 152, 154 are, in this embodiment, substantially linear but this need not be the case. Different shapes, paths or angles of the channels 150 or of the first and second sections 152, 154 may be used to, for example, provide different linear movement speeds or accelerations of the central barrel 144. The skilled person would readily be aware of variations that would fall within the scope of the present invention.

Each channel 150a further comprises first, second and third locating notches 156, 158, 160. The first and third locating notches 156, 158 are located at either end of each channel 150a. The second locating notch is located between the first and second sections 152, 156. Each locating notch 156, 158, 160 is shaped and dimensioned to receive the respective pin 148 is a substantially rotationally stable position as will be described.

As shown in FIGS. 5 and 6, spring 162 is provided between the central barrel 144 and an end surface of the cylindrical guide 146. However, it is to be understood that the spring 162 is optional and may not be required if, for example, the cylindrical guide 146 of FIG. 7 is used. The spring 162 is intended for use with the cylindrical guide 146a shown in FIGS. 8 and 9, and also the cylindrical guide 180 described later with reference to FIGS. 10 and 11.

The further spring 162 is provided in a nested configuration with the compression spring 136. In other words, the spring 162 surrounds a part of the compression spring 136 and is substantially parallel thereto.

The spring 162 is operable to bias the central barrel 144 away from the piston 132 in the direction of the axis X-X. Thus, to move the pins 148 and central barrel 144 from the first locating notch 156 to the second locating notch 158 along the first channel 152, a force must be in opposition to the bias of the spring 162. The same applies when moving from the second locating notch 158 to the third locating notch 160 along the second channel 154.

Further, the longitudinally applied bias from the spring 162 causes the pins 148 to be held in a respective notch 156, 158, 160, providing a substantially rotationally stable system with three discrete operational positions.

Due to the shape of the notches and the bias from the spring 162, a greater torque is required to move the pins 148 from the locating notches 156, 158, 160 than to move the pins 148 along either of the first or second sections 152, 154.

Therefore, as shown and described with reference to FIGS. 8 and 9, each of the channels 150 thus defines three stable positions for the pins 148 moving in the channels 150. Each of the three stable positions defines three discrete pressure settings for the pressure regulator 118. In summary, the selector comprises a spring mechanism which is operable to latch and hold the pressure regulator 118 in one of a set of discrete preset positions As described above, the compression spring 136 is operable to act on the piston 132 in opposition to the gas pressure acting on the piston 132. As shown in FIGS. 5 and 6, the compression spring extends along the axis X-X between the piston 132 and an end wall of the central barrel 144.

Therefore, movement of the central barrel 144 towards the piston 132 will increase the compression of the compression spring 136. This will, therefore, apply a greater force to the piston 132 and so a higher gas pressure will be required to close the aperture 134, thereby setting gas regulation at a higher pressure.

In other words, the cylindrical guides described with reference to FIGS. 8 to 11 provide an arrangement operable to enable selection of the compression length of the control compression spring 136 in a plurality of preset positions.

Thus, in summary, rotation of the graspable handle 120 enables a user to adjust the biasing force of the compression spring 136 between either a maximum and a minimum position (for the FIG. 7 embodiment of cylindrical guide) or between one of three selectable positions. In this embodiment, the first locating notch 156 of FIGS. 8 and 9 defines an "off" position in which the aperture 134 is closed by the poppet valve 128 and where there is no gas flow. The second and third locating notches 158, 160 define two different and discrete operating pressures, with the third locating notch 160 defining the highest gas pressure setting.

If the cylindrical guide 146a is used, these three settings are selectable on the pressure regulator 118. If a position different from one of the settings defined by the locating notches 156, 158, 160 is selected, then the bias of the spring 162 will cause the mechanism to move to the next notch in line, i.e. if a position is selected between the second and third notches 158, 160, then the combined bias of the spring 162, gas pressure and compression spring 134 will push the pins 148 back along the second portion of the channels 150a to the second locating notch 158. The same applies for an attempt to set the pressure at a point between the second and first notches 156, 158.

Alternative arrangements can be provided and fall within the scope of the present invention. For example, different numbers of locating notches may be provided to increase the number of discrete offset settings available.

Figure 10:
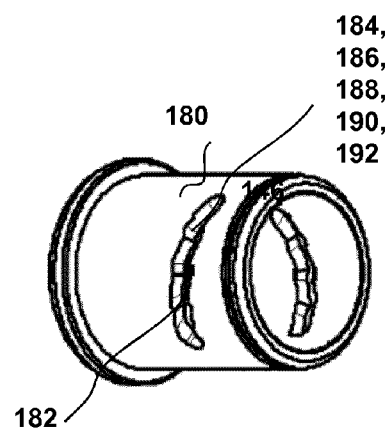
FIG. 10 is an isometric view of an alternative cylindrical guide suitable for use with the valve assembly of FIGS. 2 and 6.
Figure 11:
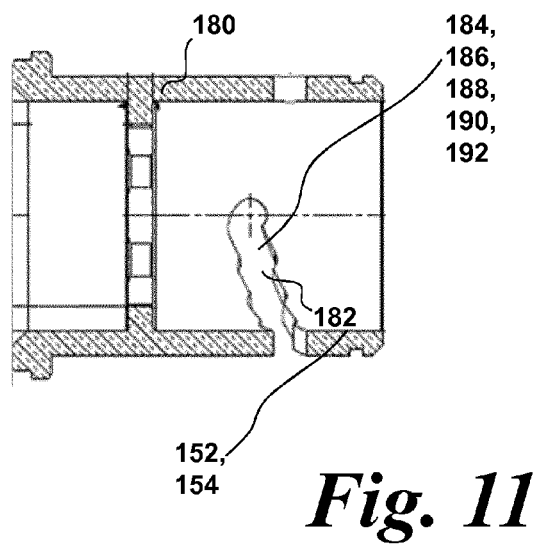
FIG. 11 is a cross section taken through the cylindrical guide of FIG. 10.

FIGS. 10 and 11 show an alternative embodiment of cylindrical guide 180 comprising channels 182. Each channel 182 comprises five locating notches 184, 186, 188, 190, 192. The locating notches 184, 186, 188, 190, 192 are substantially similar to those described previously. However, the use of the cylindrical guide 180 enables five discrete settings to be selected on the pressure regulator 118.

In the alternative, any number of locating notches may be provided as required to provide the necessary number of pre-determined pressure settings.

As will be described later, the unique use of pre-set, discrete pressure settings provides for the possibility of surge mitigation in a manner which is easy and quick for a user to set up, without the need for laborious and complex iterative measurements of the system and component pressures.

Figure 12:
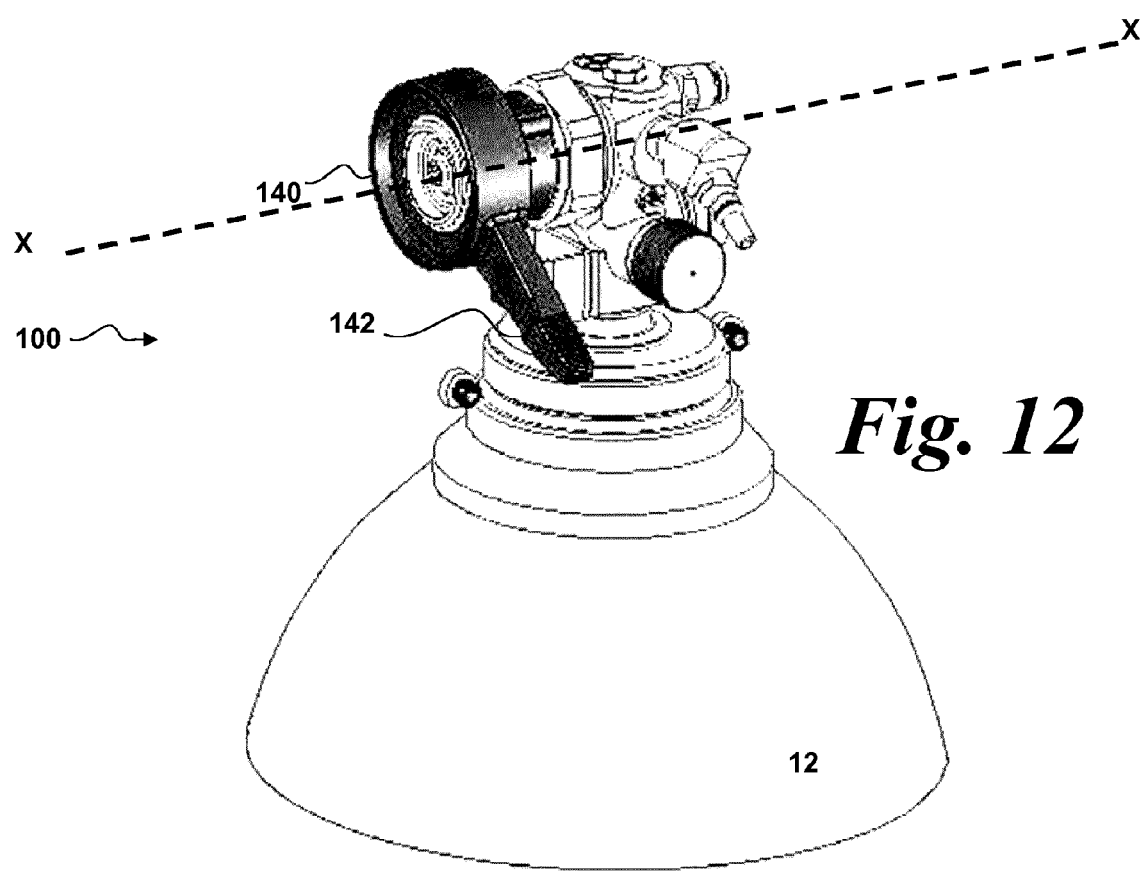
FIG. 12 is an isometric view of the valve assembly of FIG. 2 connected to a gas cylinder.

FIG. 12 shows the valve arrangement 100 connected to a gas cylinder 12. The gas cylinder 12 comprises a generally cylindrical pressure vessel having a flat base (not shown) arranged to enable the gas cylinder 12 to stand unsupported on a flat surface.

The gas cylinder 12 has a body is formed from steel, aluminium and/or composites material and is adapted and arranged to withstand internal pressures up to approximately 900 barg. A neck 12a is located at a proximal end of the gas cylinder 12 opposite to the base and defines an aperture providing access to the interior of the gas cylinder. The neck 12a comprises a screw thread (not shown) adapted to receive the valve arrangement 100.

As described, the valve arrangement communicates with the interior of the gas cylinder 12 through the inlet 106 and conduit 104. The conduit 104 extends into the centre section of the gas cylinder 12. The valve body 102 has a complimentary threaded portion which connects to the neck 12a of the gas cylinder 12.

The gas cylinder 100 defines a pressure vessel having an internal volume. Any suitable fluid may be contained within the gas cylinder 100. However, the present embodiment relates, but is not exclusively limited to, purified permanent gases which are free from impurities such as dust and/or moisture. Non-exhaustive examples of such gases may be: Oxygen, Nitrogen, Argon, Helium, Hydrogen, Methane, Nitrogen Trifluoride, Carbon Monoxide, Krypton or Neon.

The user is able to select the desired output pressure by means of rotation of the graspable handle 120. The graspable handle 120 comprises a graspable arm 142 which is rotatable by a user between the either the minimum and maximum values, or between the three to five selectable positions. This is shown in FIGS. 13 and 14.

Figure 13:
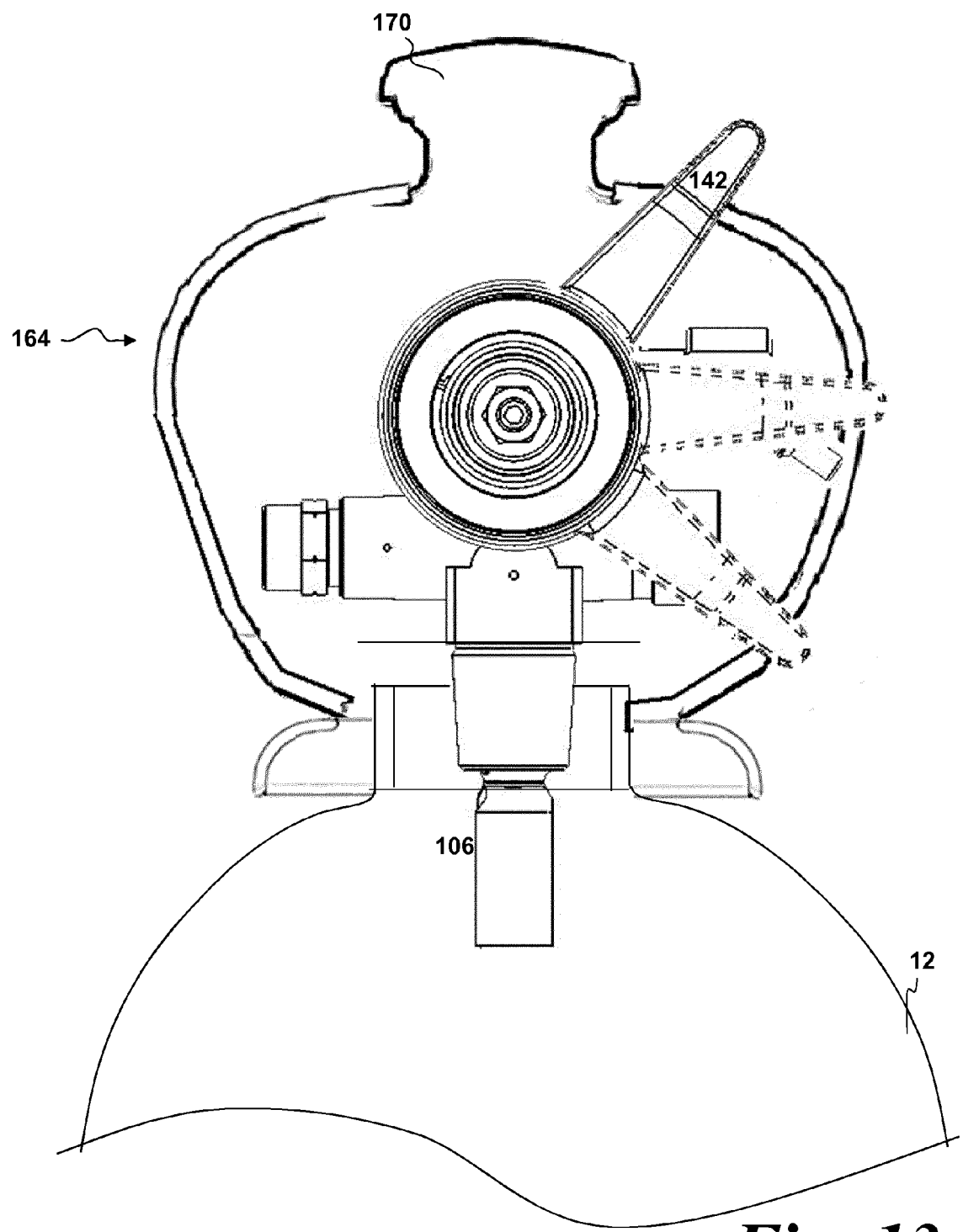
FIG. 13 is a partial cutaway of the gas cylinder and valve assembly of FIG. 12 showing a graspable control handle of the valve assembly in various operational positions.
Figure 14:
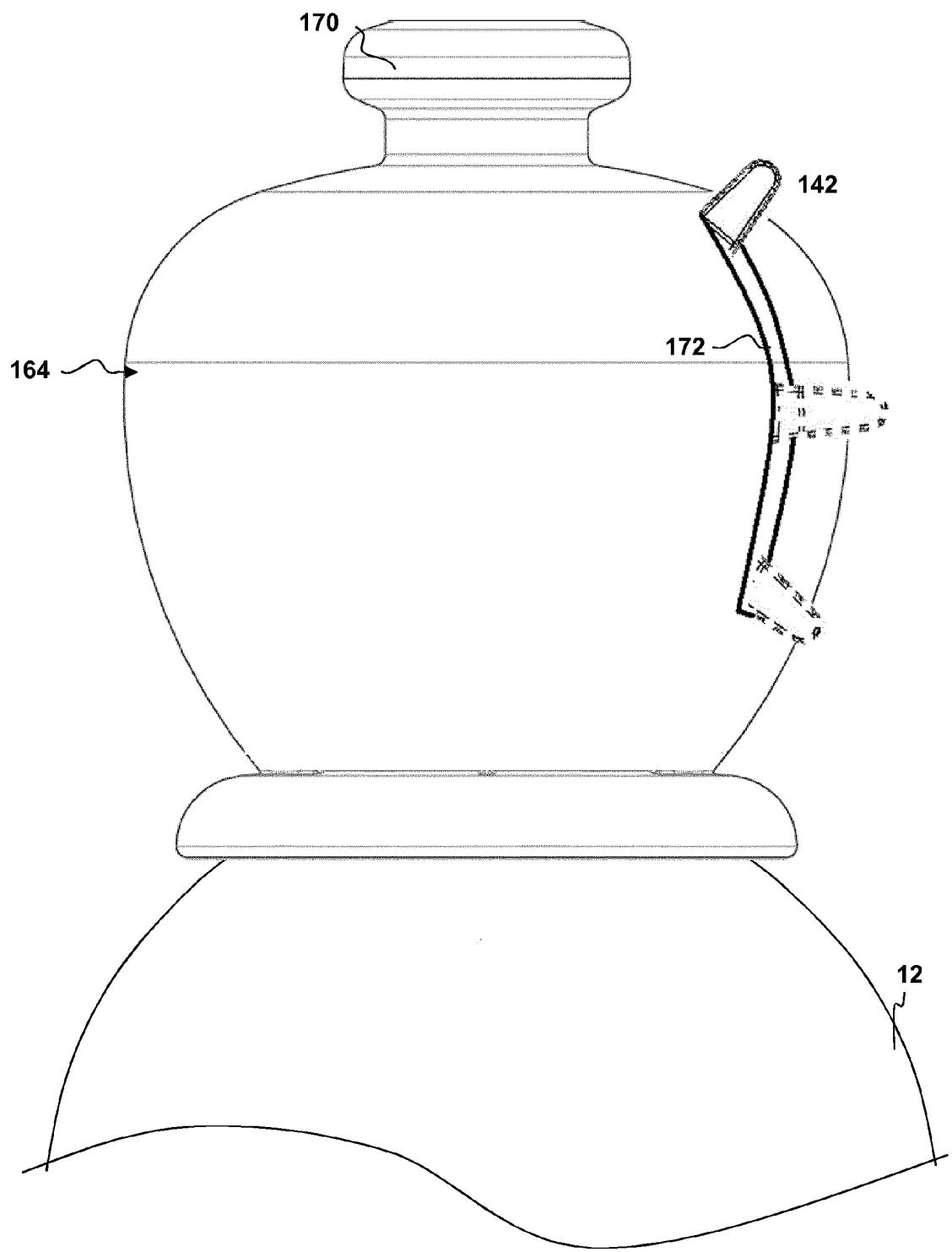
FIG. 14 is a view similar to that of FIG. 13 but showing the gas cylinder and valve assembly as it would be seen from an external observer in use.

FIG. 13 shows a composite section through a part of the valve arrangement 100 and gas cylinder 12. FIG. 14 shows a similar view showing how the valve arrangement 100 and gas cylinder 12 would appear in use to an external observer.

Referring to FIG. 13, it can be seen that the graspable arm 142 offers a clear visual indicator by which users may determine, from a cursory glance, whether the gas cylinder 12 is in use and the line attached is pressurised. Further, a clear visual indicator of the pressure setting selected is available upon brief visual inspection.

Further, the graspable handle 120 and associated arrangement provides significant advantages over known arrangements. The graspable handle 142 only has to be rotated through a relatively small angle between on and off positions when compared to known valve arrangements. The angle through which the graspable handle 120 has to be rotated between extreme positions is less than 180°, and preferably 90° or less. This is in contrast to existing arrangements where a tap or valve control has to be given many turns to close or open the respective valve.

Further, when located on an upright gas cylinder 12, the graspable handle 120 is rotatable about a substantially horizontal axis. This is easy and intuitive to operate for a user. Further, the angular movement of the graspable arm 142 between the selectable pressure settings occurs in a substantially vertical plane, aiding observation by a user.

Referring to FIGS. 13 and 14, a guard arrangement 164 is provided to shield the valve arrangement 100 in use. As shown in FIG. 13, the guard 164 is formed in three components: first and second housings 166, 168 and a rotatable cap 170. The first and second housings 166, 168 are arranged to form a clamshell structure connected by the rotatable cap 170 at an upper end and by fixing means (such as screws) at a lower end.

When assembled, the first and second housings 166, 168 and the rotatable cap 170 form the guard 164. The guard 164 is substantially elliptical and has a circular cross-section. Provision may be made within the structure of the guard 164 for one or more access ports (not shown). These access ports may include items such as a display, or provide access to the outlet 108 or the fill port 110.

The guard arrangement 164 is arranged to surround the valve arrangement 16 and protection structure 100, and provides both structural and environmental protection for the valve 16 and related components. In other words, the guard 164 forms a housing or cover for the valve 16.

Further, the guard 164 improves the aesthetic appearance of the cylinder assembly 10 and enables further items to be contained within; for example, an electronic display (arranged to fit in an aperture 120a formed in the first housing 120) or additional electronics or components required for operation of the gas cylinder assembly 10.

The rotatable cap 170 is arranged to rotate about the longitudinal axis of the gas cylinder 12 and around the upper end of the guard 164 and protection structure 100 so that the cylinder assembly 10, when in an upright position, can be rolled by a user whilst the user holds the rotatable cap 170 with one hand. The fixing means are then used at a lower end of the guard 164 to secure the first and second housings 166, 168 to one another and to the valve 16.

The first and second housings 166, 168 may be made from any suitable material. Nevertheless, injection moulded plastics material is the preferred material choice due to the ease of manufacture and the range of design freedom. Plastics materials such as ABS or polycarbonate may be used in non-limiting and non-exhaustive examples.

As shown in FIG. 14, an aperture 172 is formed in the guard 164. The aperture 172 is in the form of a channel and is designed to enable the distal end of the graspable handle 142 to protrude from within the interior of the guard 164. Therefore, the graspable handle 172 can be easily manipulated by a user whilst maintaining the structural, aesthetic and safety benefits of the guard 164. Such a configuration would only be practicable with a rotating graspable arm 142 which moves, in use, in a substantially vertical plane. This enables the position of the graspable arm 142 to be inspected visually readily and without ambiguity.

Figure 15:
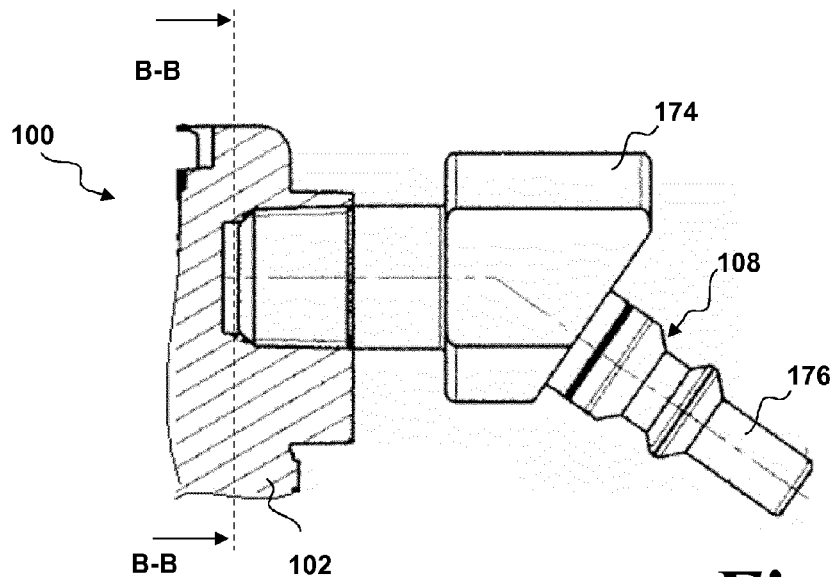
FIG. 15 is a cross-sectional view taken through a part of the valve of FIG. 3 in the direction B-B shown in FIG. 3.

FIG. 15 shows a further cross section through a part of the valve arrangement 100 taken in the direction B-B shown in FIG. 2.

FIG. 15 shows the outlet 108. The outlet 108 comprises a fixed-size flow orifice 174 and a quick connect adapter 176. The quick connect adapter 176 is adapted and arranged to enable the gas cylinder 100 to be connected to other components in a gas assembly; for example, hoses, pipes, or further pressure valves or regulators.

The fixed-size flow orifice 174 is selected from a group of suitable orifices, and is easily interchangeable depending upon the desired end application, flow rate and duty cycle that is required. Each of the available flow control orifices 174 is sized to give nominal application flows when matched to the discrete pressure settings of the pressure regulator 118 as described. The flows which the various selectable orifices sizes can provide may overlap in flow range when taken with different pressure settings. However, each combination provides specific advantages when used with different flow rates and duty cycles.

The end user may be provided with a sizing guide, or point-of use flow measuring equipment can determine which combination of flow selector setting and orifice size is optimal for the application and minimizing weld surge.

Figure 16:
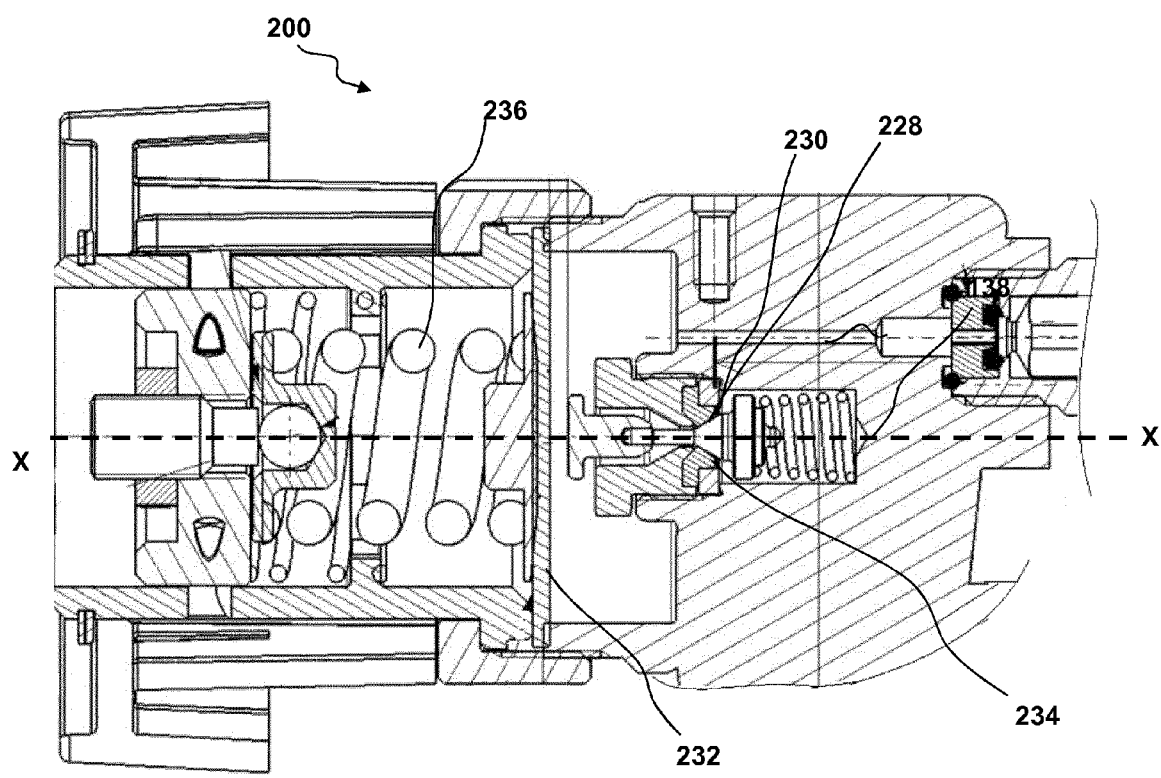
FIG. 16 is a cross-sectional view similar to FIG. 5 through a second embodiment of the valve assembly.

A second embodiment of the invention is shown in FIG. 16. The second embodiment comprises a valve arrangement 200. In the embodiment of FIG. 16, the valve arrangement 200 comprises a pressure regulator 218. The pressure regulator 218 is substantially similar to the pressure regulator 116 of the first embodiment. However, in the second embodiment, a diaphragm 232 is used in place of the piston 132 of the first embodiment.

As shown in FIG. 16, the valve region 226 comprises a poppet valve 228 located adjacent a valve seat 230. The poppet valve 228 is connected to a diaphragm 232 which is configured to enable translational movement of the poppet valve 228 along the axis X-X towards and away from the valve seat 230 to close and open respectively an aperture 234 therebetween. The diaphragm 232 is sealed at ends thereof and operable to move in response to gas pressure.

The diaphragm 232 is resiliently biased by a biasing arrangement in the form of a control spring 236 located about the axis X-X. A further opposing spring 238 is provided to act directly on the poppet valve 228 to provide a stabilising and centring force on the poppet valve 228.

The regulator 218 is operable to receive gas from the gas cylinder 12 at full cylinder pressure (e.g. 100-900 bar), but to deliver gas at a substantially constant fixed low pressure (e.g. 5 bar) to the outlet 108. This is achieved by a feedback mechanism whereby the pressure of gas downstream of the aperture 234 is operable to act on the diaphragm 232 in a chamber adjacent thereof, and in opposition to the biasing force of the spring 236. This counterbalancing effect on the diaphragm 232 provides for a particular pressure at which the system is in equilibrium. Thus, at the desired particular set pressure, the spring and gas forces are selected to be equal.

Therefore, should the pressure of gas in the region adjacent the diaphragm 232 exceed the specified level, the diaphragm 232 is operable to distort and cause movement of the poppet valve 228 along the axis X-X (towards the left hand side of FIGS. 5 and 6). As a result, the poppet valve 228 is moved closer to the valve seat 230, reducing the size of the aperture 234 and, consequently, restricting flow of gas from the inlet 106 to the outlet 108. Concomitantly, if the gas pressure reduces, the diaphragm 232 returns towards it original, undistorted shape and the poppet valve 228 is moved away from the valve seat 230, increasing the size of the aperture 234 is increased.

Figure 17:
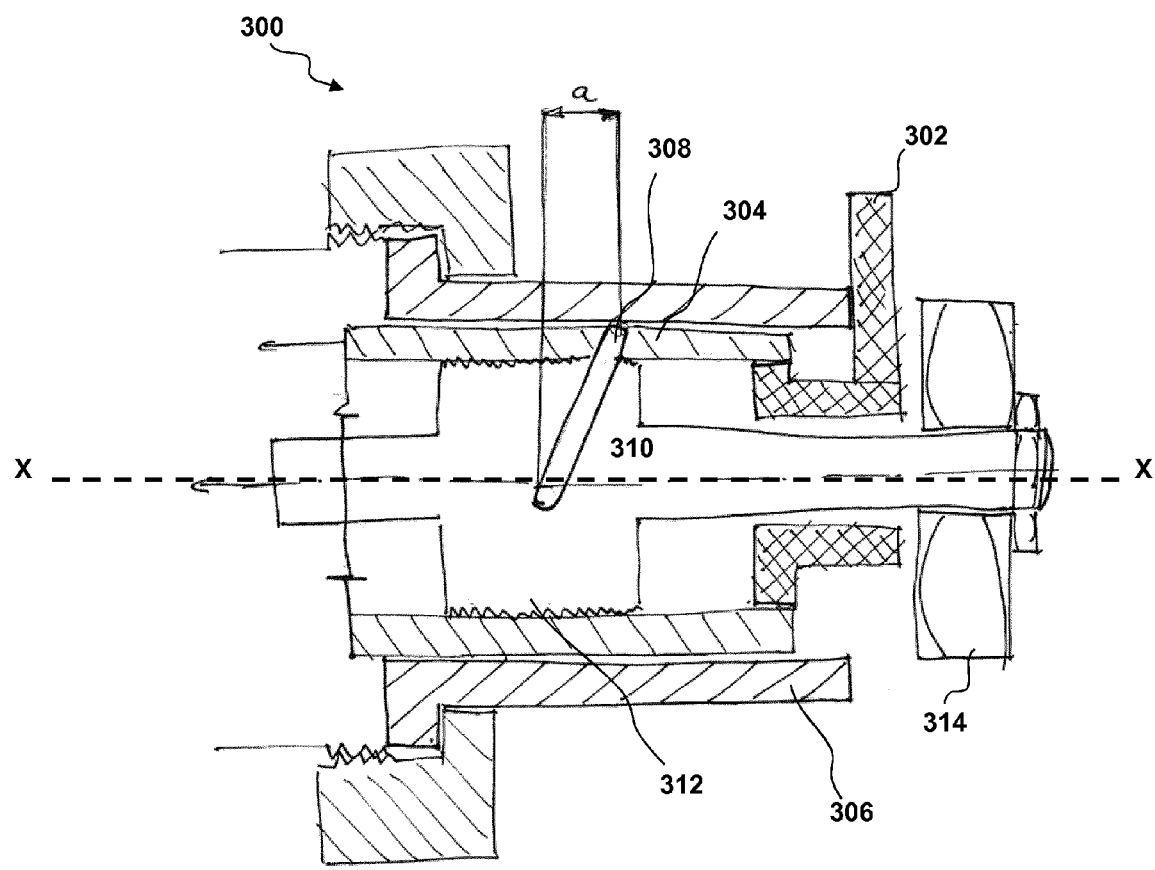
FIG. 17 is a general schematic of a third embodiment of the valve assembly.

A third embodiment of the invention is shown in FIG. 17. The features of the third embodiment shown in FIG. 17 which are in common with the first and second embodiments of FIGS. 3 to 16 are allocated the same reference numerals and will not be described again here.

The third embodiment comprises a valve arrangement 300. In the embodiment of FIG. 17, the predetermined discrete selectable positions are further able to be modified by provision of a fine tuning selector. As previously described, rotational movement of the graspable handle 302 causes the central barrel 304 to move along the axis X-X relative to the cylindrical guide 306 by means of the pins 308 sliding within the channels 310.

However, the valve arrangement 300 further provides a mechanism for adjusting, via a further barrel 312, the relative positions of the channel 310 and pins 308. The barrel 312 can be adjusted my means of a further, fine adjustment handle 314. This has the effect of enabling translation along the axis X-X to refine the pressure set points.

In other aspects, the valve arrangement 300 corresponds to the valve arrangement 100 or, alternatively, the valve arrangement 200 of FIG. 16.

In use, a user selects a particular pressure regulator 118 setting and flow restriction orifice 176 size to achieve a particular flow rate with particular anti-surge properties optimised for a particular application.

Whilst the above embodiments have been described with reference to either a continuous variation of gas pressure, or two operational and one closed preset positions, the skilled person would be readily aware of alternatives that would fall within the scope of the present application. For example, any suitable number of discrete selectable positions may be used with the present invention.

Further, whilst the present invention has been described with reference to controlling the compression length of a single control compression spring (spring 136 in the first embodiment), the present invention may comprise more than one compression control spring. For example, when selecting a pressure value, the present invention may be operable to select different springs, or a unique combination of springs, for each discrete pressure setting, or to switch between biasing means when continuously varying the pressure.

Additionally, the rotating handle arrangement of the present invention provides further benefits. For example, the movement of the handle in a substantially vertical plane enables the handle to comprise a locking means for engaging with, for example, the guard 164 to enable the pressure regulator 118 to be locked in predetermined position.

Whilst the pressure regulator of the above embodiments has been described as relating to either a piston regulator or a diaphragm regulator, other arrangements could be contemplated by the skilled person and would fall within the scope of the present invention. For example, in place of a diaphragm or piston, the pressure regulator may comprise a dome loaded with a fixed sealed reference pressure, with the rotating arm changing the volume of the sealed reference and hence the pressure.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

Similar situations may well apply equally to other gas applications supplied by high pressure gas cylinders, such as in food MAP and beverage dispense systems.

The invention claimed is:

1. A pressure regulator assembly comprising a pressure regulator arranged to regulate the flow rate of a gas source from a gas cylinder, the pressure regulator comprising:
   a housing having an inlet connectable to the gas source, an outlet, a conduit extending between the inlet and the outlet;
   a restriction device located in the conduit and positionable to restrict the flow of gas therethrough;
   a biasing arrangement to apply a predetermined bias to the restriction device;
   a selection device operable to select a configuration of the biasing arrangement and restriction device to provide a selected gas pressure at said outlet; and
   a rotatable handle rotatable about an axis of rotation and comprising a central boss and a graspable arm;
   wherein the selection device comprises a rotary control member connected to said rotatable handle such that rotational movement of said rotatable handle about said axis of rotation between maximum and minimum positions is operable to move a control device between corresponding maximum and minimum linear positions in a direction substantially parallel to the axis of rotation, the bias from said biasing arrangement being dependent upon the linear position of the control device, and
   wherein the angular difference in position of the rotatable handle between said maximum and minimum positions is 180 degrees or less and, when the pressure regulator assembly is located on a gas cylinder and said gas cylinder is in a substantially upright position, the rotatable handle is rotatable about a substantially horizontal axis such that said graspable arm moves in a substantially vertical plane.

2. A pressure regulator assembly according to claim 1, wherein the angular difference in position of the rotatable handle between said maximum and minimum positions is 90 degrees or less.

3. A pressure regulator assembly according to claim 1, wherein said graspable arm has a longitudinal axis, said longitudinal axis extending away from said axis of rotation in a substantially radial direction.

4. A pressure regulator assembly according to claim 1, further comprising a guard arranged to surround the pressure regulator, the guard comprising an aperture arranged such that, in use, at least a part of the graspable arm extends therethrough irrespective of the position of the rotatable handle.

5. A pressure regulator assembly according to claim 4, wherein the aperture comprises an arcuate channel.

6. A pressure regulator assembly according to claim 1, wherein the biasing arrangement comprises at least one control compression spring and the bias of the control compression spring is dependent upon the linear offset of said control device.

7. A pressure regulator assembly according to claim 1, wherein said control device comprises at least one pin operable to slide within at least one corresponding channel on said rotary control member, said pin and channel controlling the linear movement of said control device.

8. A pressure regulator assembly according to claim 1, wherein the selection device has a plurality of discrete, offset positions defining a plurality of discrete, offset configurations of the biasing arrangement and restriction device each to provide a selected gas pressure at said outlet.

9. A pressure regulator assembly according to claim 8, wherein the number of selectable discrete, offset positions is five or fewer.

10. A pressure regulator assembly according to claim 9, wherein the or each channel comprising a plurality of locating notches for receiving the or each corresponding pin, each locating notch defining a discrete configuration of said selection device.

11. A pressure regulator assembly according to claim 1, wherein the restriction device comprises a linearly-movable valve connected to a diaphragm or a piston.

12. A gas cylinder assembly including a pressure regulator assembly of claim 1 and a gas cylinder.

13. A gas cylinder assembly according to claim 12, further comprising a guard arranged to surround the pressure regulator, the guard comprising an aperture arranged such that, in use, at least a part of the graspable arm extends therethrough irrespective of the position of the rotatable handle.

14. A gas cylinder assembly according to claim 12, wherein the aperture comprises an arcuate channel.

15. A gas cylinder assembly according to claim 12, wherein the biasing arrangement comprises at least one control compression spring and the bias of the control compression spring is dependent upon the linear offset of said control device.

16. A gas cylinder assembly according to claim 12, wherein said control device comprises at least one pin operable to slide within at least one corresponding channel on said rotary control member, said pin and channel controlling the linear movement of said control device.

17. A gas cylinder assembly according to claim 12, wherein the selection device has a plurality of discrete, offset positions defining a plurality of discrete, offset configurations of the biasing arrangement and restriction device each to provide a selected gas pressure at said outlet.

18. A gas cylinder assembly according to claim 12, wherein the number of selectable discrete, offset positions is five or fewer.

19. A gas cylinder assembly according to claim 12, wherein the or each channel comprising a plurality of locating notches for receiving the or each corresponding pin, each locating notch defining a discrete configuration of said selection device.

20. A gas cylinder assembly according to claim 12, wherein the restriction device comprises a linearly-movable valve connected to a diaphragm or a piston.

* * * * *